United States Patent
Lee et al.

(10) Patent No.: US 9,030,625 B2
(45) Date of Patent: May 12, 2015

(54) LIQUID CRYSTAL DISPLAY

(71) Applicant: Samsung Display Co., Ltd., Yongin (KR)

(72) Inventors: Joon-Ik Lee, Asan-si (KR); Yong Woo Lee, Suwon-si (KR); Toru Tsunekawa, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 120 days.

(21) Appl. No.: 13/826,981

(22) Filed: Mar. 14, 2013

(65) Prior Publication Data

US 2014/0125902 A1    May 8, 2014

(30) Foreign Application Priority Data

Nov. 2, 2012    (KR) .................. 10-2012-0123652

(51) Int. Cl.
 *G02F 1/1335*    (2006.01)
(52) U.S. Cl.
 CPC ................... *G02F 1/133608* (2013.01)
(58) Field of Classification Search
 USPC ............................................ 349/58, 149–151
 See application file for complete search history.

(56) References Cited

U.S. PATENT DOCUMENTS

| | | | |
|---|---|---|---|
| 6,611,310 B2 * | 8/2003 | Kurahashi et al. | ............ 349/141 |
| 7,102,705 B2 | 9/2006 | Kim et al. | |
| 7,435,914 B2 | 10/2008 | Cheng | |
| 7,527,417 B2 | 5/2009 | Han et al. | |
| 7,800,730 B2 | 9/2010 | Kang et al. | |
| 7,978,284 B2 * | 7/2011 | Hashino | .......................... 349/61 |
| 8,031,315 B2 | 10/2011 | Seo et al. | |

FOREIGN PATENT DOCUMENTS

| | | |
|---|---|---|
| JP | 11-258618 | 9/1999 |
| KR | 10-2005-0064386 | 6/2005 |
| KR | 10-2005-0113759 | 12/2005 |
| KR | 10-2007-0019358 | 2/2007 |
| KR | 10-2010-0088884 | 8/2010 |

* cited by examiner

*Primary Examiner* — James Dudek

(74) *Attorney, Agent, or Firm* — H.C. Park & Associates, PLC

(57) ABSTRACT

A liquid crystal display, including: a liquid crystal panel including a first display panel and opposing second display panel opposite the first display panel, a backlight assembly configured to provide light to the liquid crystal panel, a receiving member configured to support the backlight assembly, and an adhesive member configured to couple the liquid crystal panel and the receiving member. The first display panel includes a display area configured to display an image, a peripheral area disposed outside the display area, and a plurality of integrated circuit ("IC") chips disposed in the peripheral area, the plurality of IC chips being configured to apply a driving signal to the display area. The adhesive member is disposed in the peripheral area and does not overlap with the plurality of IC chips.

19 Claims, 9 Drawing Sheets

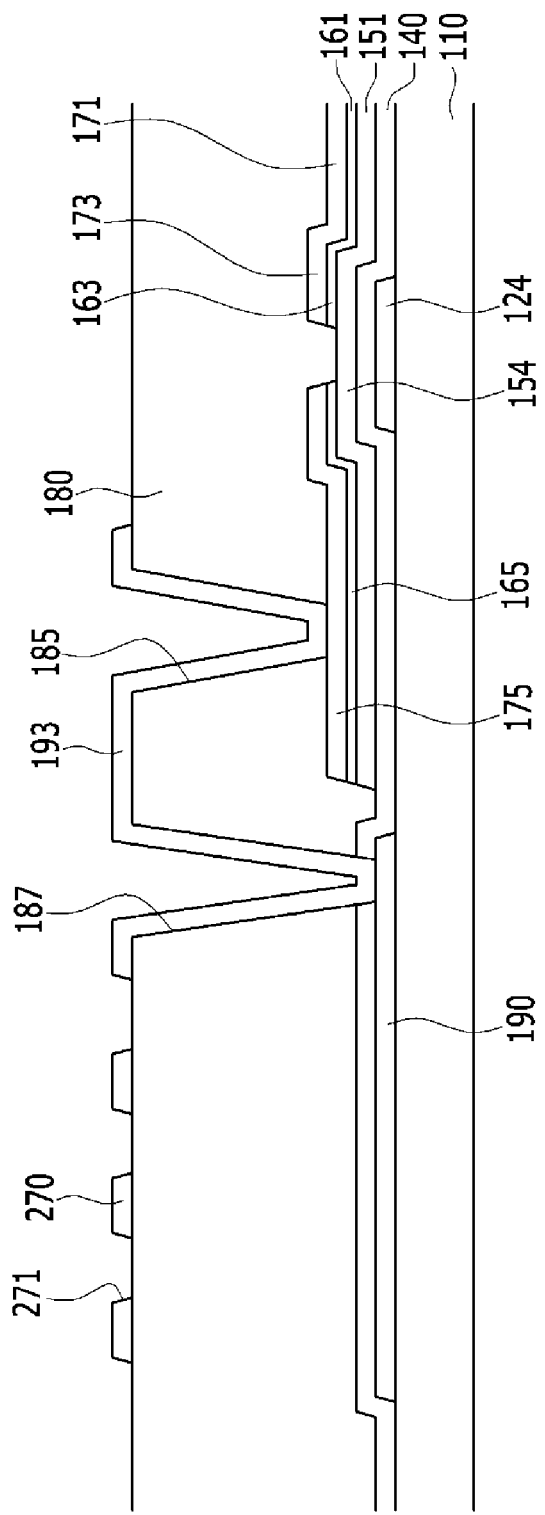

LIQUID CRYSTAL DISPLAY

CROSS-REFERENCE TO RELATED APPLICATION

This application claims priority from and the benefit of Korean Patent Application No. 10-2012-0123652, filed on Nov. 2, 2012, which is hereby incorporated by reference for all purposes as if fully set forth herein.

BACKGROUND

1. Field

Exemplary embodiments relate to a liquid crystal display.

2. Discussion of the Background

A liquid crystal display, which is one of the most common types of flat panel displays in use, includes two sheets of display panels with field generating electrodes such as a pixel electrode, a common electrode and the like, and a liquid crystal layer interposed therebetween.

The liquid crystal display generates an electric field in the liquid crystal layer by applying voltage to the field generating electrodes, and determines a direction of liquid crystal molecules of the liquid crystal layer by the generated electric field, thus controlling polarization of incident light so as to display images.

The liquid crystal display has an advantage in that slimness may be easily implemented, but also has a drawback in that side visibility is inferior to front visibility. Therefore, to overcome such a drawback, various liquid crystal arrangements and driving methods thereof have been developed. As a method for implementing a wide viewing angle, a liquid crystal display, in which field generating electrodes are all formed in one substrate, has drawn much attention.

The conventional liquid crystal display includes a liquid crystal panel, a backlight assembly providing light to the liquid crystal panel, and a chassis supporting the backlight assembly, in which the liquid crystal panel is fixed to the chassis. The liquid crystal panel includes a display area displaying an image and a peripheral area disposed outside the display area. The liquid crystal panel and the chassis are fixed together by using an adhesive member, in which a stress of the adhesive member may have an influence on an IC chip, thus causing light leakage phenomenon at a boundary between the display area and the peripheral area.

The above information disclosed in this Background section is only for enhancement of understanding of the background of the invention and therefore it may contain information that does not form the prior art that is already known in this country to a person of ordinary skill in the art.

SUMMARY

Exemplary embodiments provide a liquid crystal display having an advantage of preventing a light leakage at a boundary between a display area and a peripheral area.

Additional features of the invention will be set forth in the description which follows, and in part will be apparent from the description, or may be learned by practice of the invention.

Exemplary embodiments of the present invention provide a liquid crystal display, including: a liquid crystal panel including a first display panel and opposing second display panel opposite the first display panel; a backlight assembly configured to provide light to the liquid crystal panel; a receiving member configured to support the backlight assembly; and an adhesive member configured to couple the liquid crystal panel and the receiving member. The first display panel includes a display area configured to display an image, a peripheral area disposed outside the display area, and a plurality of integrated circuit ("IC") chips disposed in the peripheral area, the plurality of IC chips being configured to apply a driving signal to the display area. The adhesive member is disposed in the peripheral area and does not overlap with the plurality of IC chips.

Exemplary embodiments provide a display, including: a display panel; a backlight assembly configured to illuminate the display panel; a receiving member configured to support the backlight assembly; and an adhesive member configured to couple the display panel and the receiving member. The display panel includes a display area configured to display an image, a peripheral area disposed outside the display area, and a plurality of integrated circuit (IC) chips disposed in the peripheral area, the plurality of IC chips being configured to apply a driving signal to the display area. The adhesive member is disposed in the peripheral area and does not overlap with the plurality of IC chips.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 9 is a cross-sectional view illustrating the thin film transistor array panel of FIG. 8 taken along sectional line IX-IX, according to exemplary embodiments.

DETAILED DESCRIPTION OF THE ILLUSTRATED EMBODIMENTS

Figure 1:
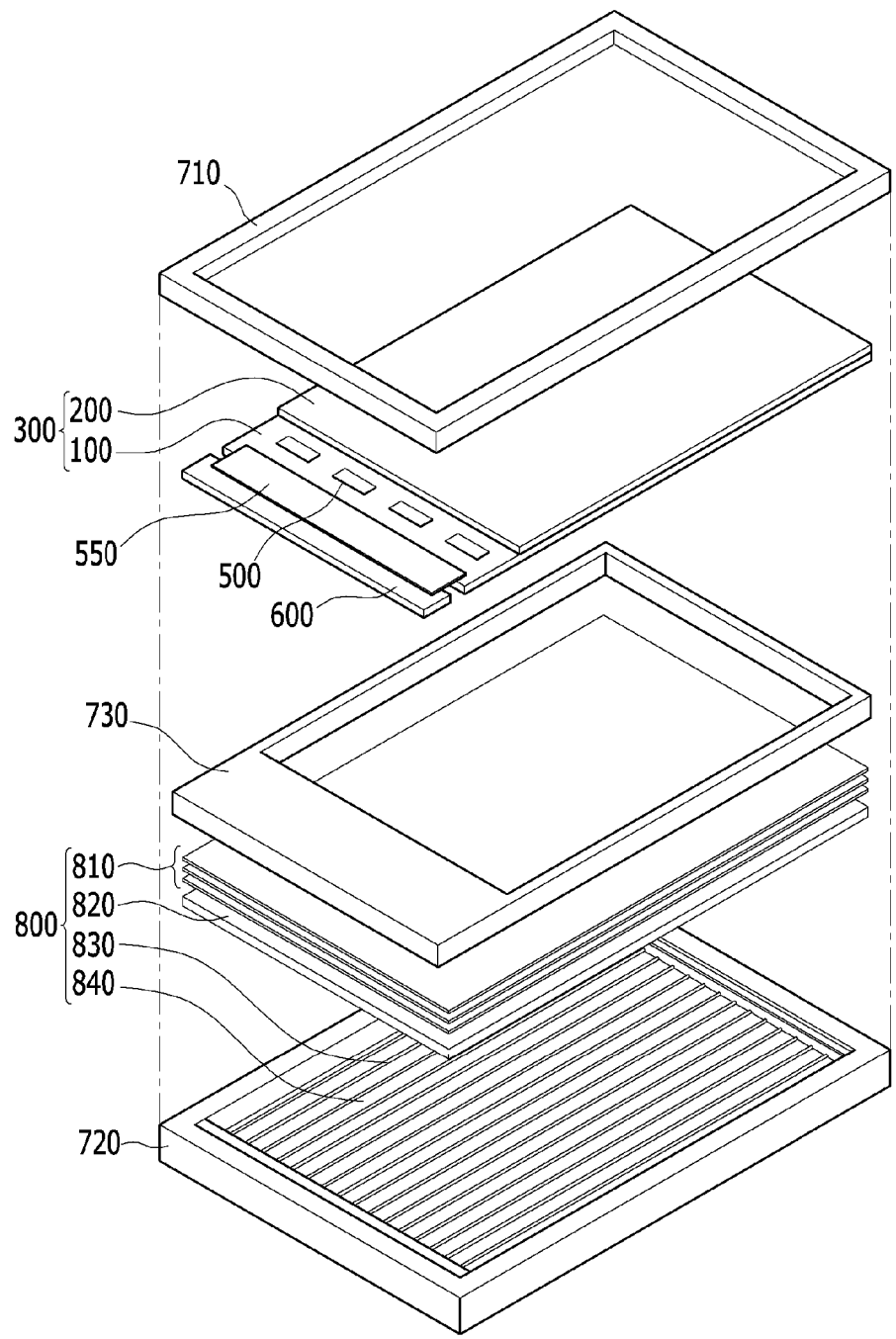
FIG. 1 is an exploded perspective view of a liquid crystal display according to exemplary embodiments.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, directly connected to, or directly coupled to the other element or layer, or intervening elements or layers may be present. In contrast, when an element or layer is referred to as being "directly on," "directly connected to," or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
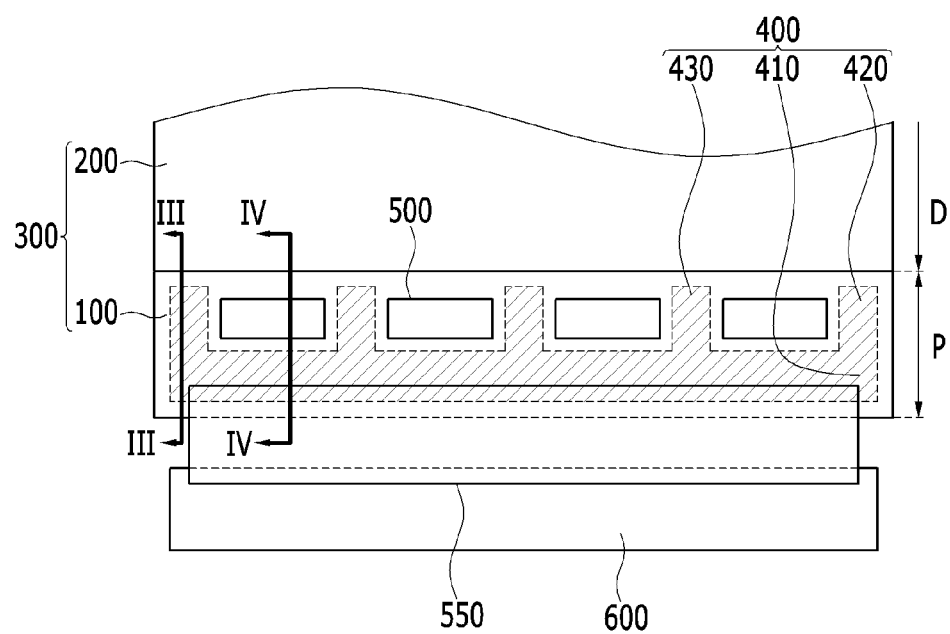
FIG. 2 is a diagram illustrating a part of the liquid crystal display illustrated in FIG. 1, according to exemplary embodiments.
Figure 3:
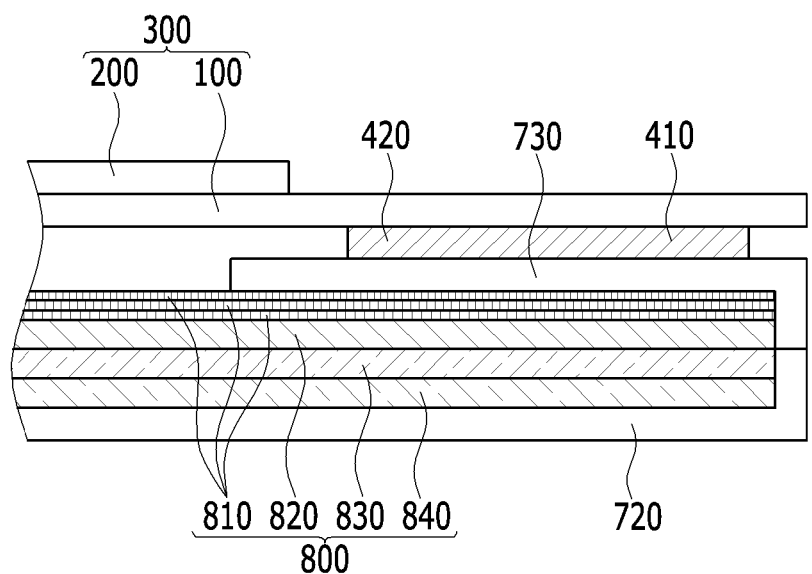
FIG. 3 is a cross-sectional view taken along sectional line III-III of FIG. 2, according to exemplary embodiments.
Figure 4:
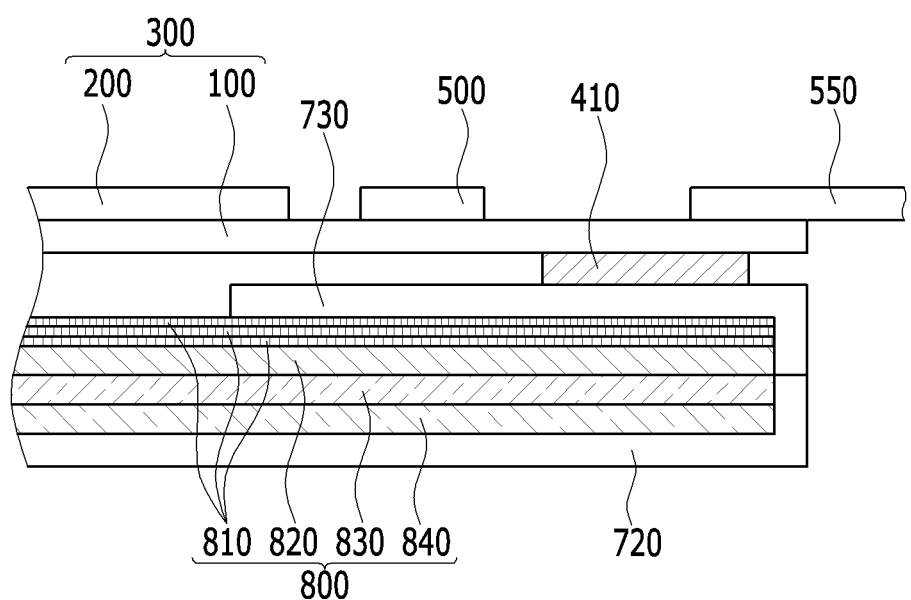
FIG. 4 is a cross-sectional view taken along line IV-IV of FIG. 2, according to exemplary embodiments.

FIG. 1 is an exploded perspective view of a liquid crystal display according to exemplary embodiments. FIG. 2 is a diagram illustrating a part of the liquid crystal display according to FIG. 1. FIG. 3 is a cross-sectional view taken along sectional line III-III of FIG. 2. FIG. 4 is a cross-sectional view taken along sectional line IV-IV of FIG. 2.

As illustrated in FIGS. 1 to 4, the liquid crystal display includes a liquid crystal panel 300 configured to display an image and a backlight assembly 800 configured to provide light to the liquid crystal panel 300. Further, the liquid crystal display includes a top chassis 710, a bottom chassis 720, and a molded frame 730 that are configured to fix and support the liquid crystal panel 300 and the backlight assembly 800. The liquid crystal display may include the top chassis 710.

The liquid crystal panel 300 includes a thin film transistor array panel 100 including a plurality of thin film transistors, an opposing display panel 200 opposite the thin film transistor array panel 100, and liquid crystal (not illustrated) injected between the two display panels 100 and 200. Here, the thin film transistor array panel 100 and the opposing display panel 200 may also be referred to as a first display panel and a second display panel, respectively.

The thin film transistor array panel 100 includes a display area D configured to display an image and a peripheral area P disposed outside the display area D.

Figure 6:
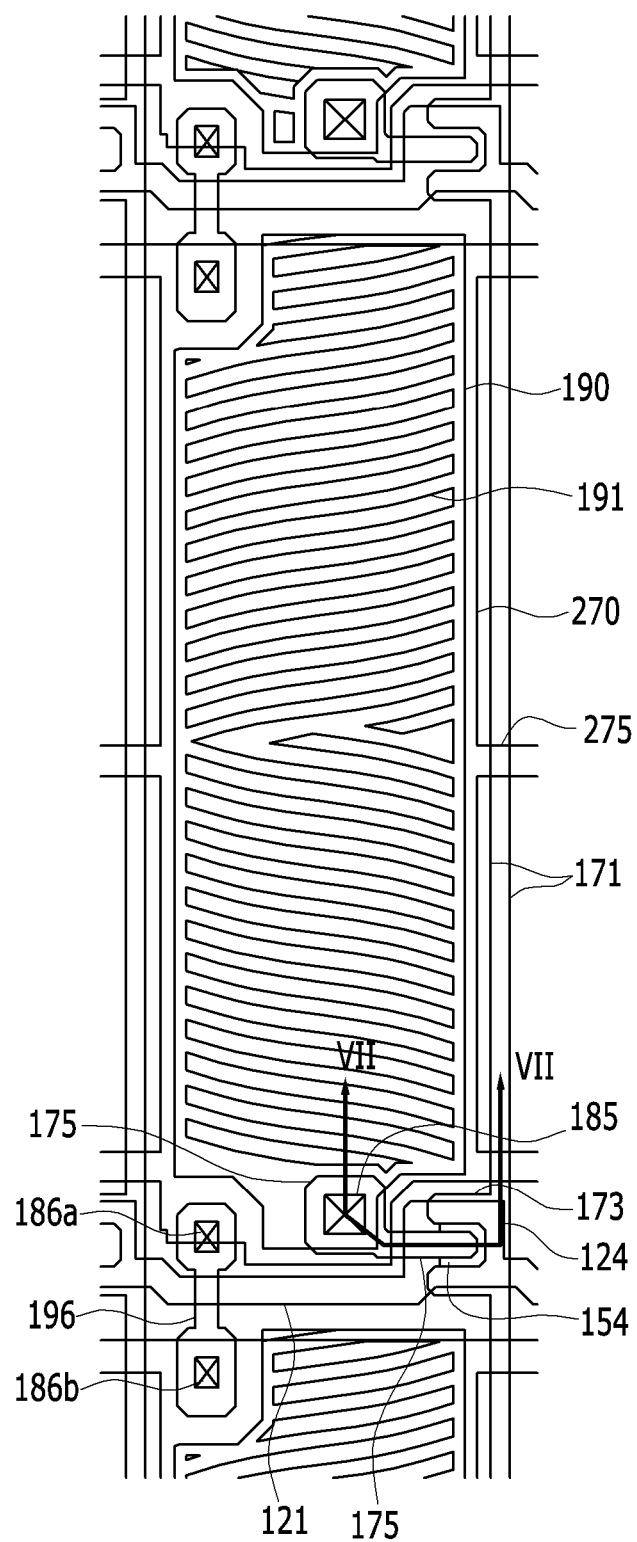
FIG. 6 is a layout view illustrating a pixel of a thin film transistor array panel according to exemplary embodiments.

As illustrated in FIG. 6, a pixel electrode 190 and a reference electrode 270 to be described in more detail below are formed in the display area D. The pixel electrode 190 is configured to receive a data voltage, and the reference electrode 270 is configured to receive a reference voltage, so that an electric field is generated between the two electrodes 190 and 270, and liquid crystal molecules of a liquid crystal layer (not illustrated) disposed between the two electrodes 190 and 270 rotate in a direction parallel to a direction of the electric field. Polarization of light passing through the liquid crystal layer varies according to a rotational direction of liquid crystal molecules as determined above.

A plurality of IC chips 500, which are configured to apply a gate driving signal and a data driving signal to the display area D, is formed in the peripheral area P.

In the opposing display panel 200, red, green and blue filters, which are color filters configured to display a color while light passes on an insulation substrate such as transparent glass, are formed by a thin film processing technique. According to exemplary embodiments, the color filters are disposed in the opposing display panel 200, but are not limited thereto, and may be formed in the thin film transistor array panel 100.

The backlight assembly 800 includes a light source 830 configured to provide light, a light guide plate 820 configured to guide light emitted from the light source 830 to the liquid crystal panel 300, and an optical sheet 810 configured to provide light to the liquid crystal panel 300 by securing a luminance characteristic of light from the light source. Further, the backlight assembly 800 may include a reflective sheet 840 configured to reflect light emitted from the light source 830. The reflective sheet 840 may be disposed on a bottom surface of the bottom chassis 720.

In addition, the liquid crystal display may include a printed circuit board ("PCB") 600 configured to receive an image signal from outside of the liquid crystal panel 300 and transmit a driving signal to the liquid crystal panel 300, as well as include a connecting film 550 configured to connect the printed circuit board 600 and the liquid crystal panel 300.

The printed circuit board 600 is configured to generate a data driving signal to drive a display device, a gate driving signal, and a plurality of driving signals for applying the data driving signal and the gate driving signal at an appropriate time, thereby applying the gate driving signal and the data driving signal to the IC chip 500 through the connecting film 550.

The PCB 600 is configured to receive an image signal from a source (not shown) outside of the liquid crystal panel 300, as well as configured to transmit a driving signal to the liquid crystal panel 300. The display panel also includes the connecting film 550 configured to connect the printed circuit board 600 and the liquid crystal panel 300.

The liquid crystal panel 300 is fixed to the molded frame 730 by an adhesive member 400. The adhesive member 400 uses a double-sided adhesive tape. The adhesive member 400 is attached and fixed to a back side of the thin film transistor array panel 100, that is, a surface opposite to a part in which the IC chip 500 is formed, and the molded frame 730. The adhesive member 400 is not attached to a part in which the IC chip 500 is formed. In other words, the adhesive member 400 and the IC chip 500 do not overlap each other.

According to exemplary embodiments, the molded frame 730 and the bottom chassis 720 are configured to receive, fix, and support the backlight assembly 800, so that the liquid crystal panel 300 is fixed to the molded frame 730. However, the bottom chassis 720 alone may be configured to receive, fix and support the backlight assembly 800 without the molded frame 730. In this case, the liquid crystal panel 300 is fixed to the bottom chassis 720. Accordingly, the molded frame 730 and the bottom chassis 720, or the bottom chassis 720 alone, may serve as a receiving member that is configured to receive, fix, and support the backlight assembly 800.

The adhesive member 400 is disposed in the peripheral area P of the thin film transistor array panel 100, and includes a body 410, a plurality of first branches 420, and a plurality of second branches 430 extending from the body 410. The body 410 is disposed along one side of the thin film transistor array panel 100 and spaced apart from the IC chip 500 at an interval. The first branches 420 extend from both ends of the body 410, respectively, and are disposed to be spaced apart from the IC chip 500 at an interval. The second branches 430 extend from the body 410 corresponding to portions between the first branches 420, and are disposed between the IC chips 500. The second branches 430 are disposed to be spaced apart from the IC chip 500 at an interval, and a distance between the adjacent second branches 430 is greater than a width of the IC chip 500.

Accordingly, the adhesive member 400 is disposed to not be overlapped with the IC chip 500, so as to prevent a stress by the adhesive member 400 from having an influence on the IC chip 500, thereby preventing light leakage from being generated at a boundary between the display area D and the peripheral area P.

Figure 5:
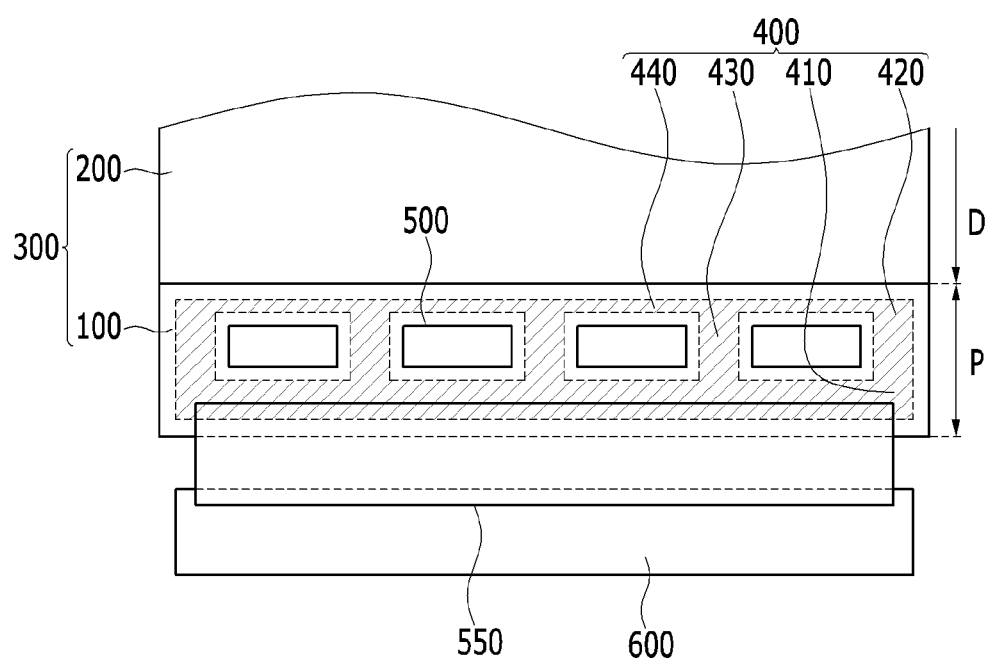
FIG. 5 is a diagram illustrating a part of the liquid crystal display according to exemplary embodiments.

FIG. 5 is a diagram illustrating a part of the liquid crystal display, according to exemplary embodiments.

Referring to FIG. 5, when comparing a structure of the liquid crystal display described in association with FIG. 1, only a shape of the adhesive member 400 is different, but the rest of the structure is the same. Accordingly, only the adhesive member 400 will be described in more detail to avoid obscuring exemplary embodiments described herein.

The adhesive member 400 is disposed in the peripheral area P of the thin film transistor array panel 100, and includes the body 410, a plurality of first branches 420, and a plurality of second branches 430 extending from the body 410. In this embodiment, the adhesive member 400 includes a connecting part 440 configured to connect the first branch 420 and the second branch 430.

The body 410 is disposed along one side of the thin film transistor array panel 100 and spaced apart from the IC chip 500 at an interval. The first branches 420 extend from both ends of the body 410, respectively, and are disposed to be spaced apart from the IC chip 500 at an interval. The second branches 430 extend from the body 410 corresponding to portions between the first branches 420, and are disposed between the IC chips 500. The second branches 430 are disposed to be spaced apart from the IC chip 500 at an interval, and a distance between the adjacent second branches 430 is greater than a width of the IC chip 500. The connecting part 440 is disposed at an opposite side of the body 410, and spaced apart from the IC chip 500 at an interval.

Figure 7:
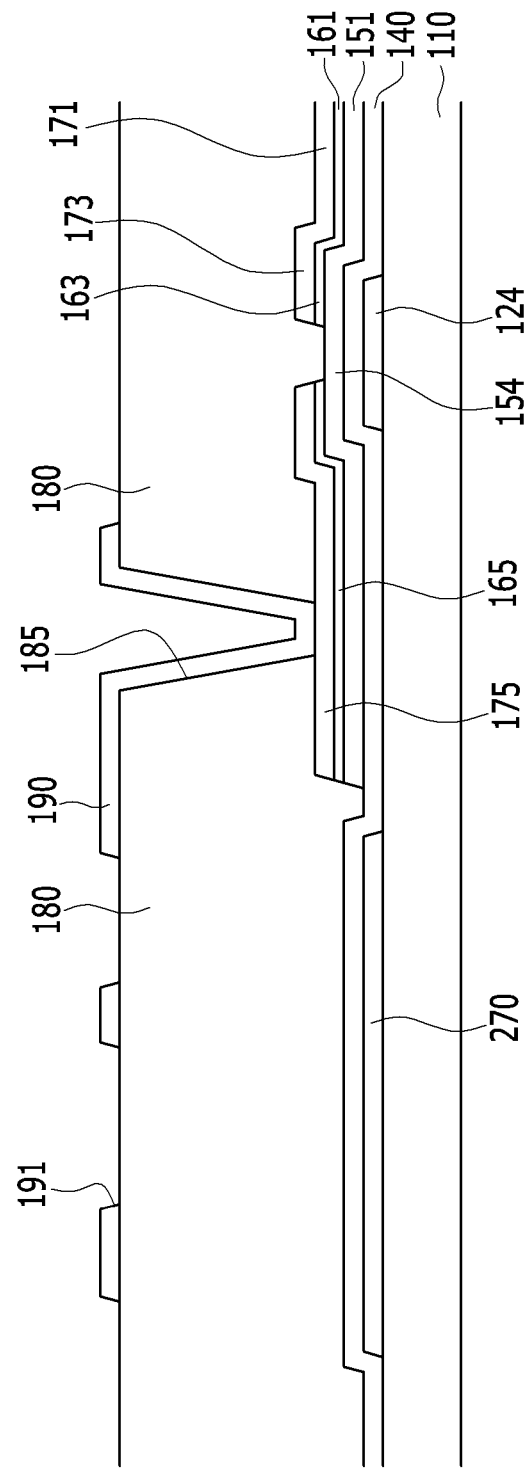
FIG. 7 is a cross-sectional view illustrating the thin film transistor array panel of FIG. 6 taken along sectional line VII-VII, according to exemplary embodiments.

FIG. 6 is a layout view illustrating a pixel of the thin film transistor array panel according to exemplary embodiments. FIG. 7 is a cross-sectional view illustrating the thin film transistor array panel of FIG. 6 taken along sectional line VII-VII.

Referring to FIGS. 6 and 7, in the thin film transistor array panel, a gate line 121 and a reference electrode 270 are formed on an insulation substrate 110 made of transparent glass, plastic, or the like.

The gate line 121 is configured to transmit a gate signal and mainly extends in a horizontal direction. Each gate line 121 includes a plurality of gate electrodes 124 protruding upwardly and a wide end (not illustrated) for connection with another layer or an external driving circuit.

A reference electrode 270 has a plane shape covering the entire pixel area and includes a connecting part 275 that connects with an adjacent pixel area. The reference electrode 270 is made of a transparent conductive material such as a polycrystal, monocrystal, or amorphous indium tin oxide (ITO) or indium zinc oxide (IZO).

On the gate line 121 and the reference electrode 270, a gate insulating layer 140 made of silicon nitride (SiNx), silicon oxide (SiOx) or the like is disposed. The gate insulating layer 140 may have a multilayer structure including at least two insulating layers having different physical properties.

On the gate insulating layer 140, a plurality of semiconductor stripes 151 made of hydrogenated amorphous silicon (also referred to as "a-Si"), polysilicon, or the like is disposed. The semiconductor stripe 151 mainly extends in a vertical direction and includes a plurality of projections 154 extending toward the gate electrode 124.

On the semiconductor 151, a plurality of ohmic contact stripes 161 and ohmic contact islands 165 are formed. The ohmic contact stripes 161 and ohmic contact islands 165 may be made of a material such as n+ hydrogenated amorphous silicon in which an n-type impurity, such as phosphorus, is doped at a high concentration, or made of silicide. The ohmic contact stripe 161 has a plurality of projections 163, and the projection 163 and the ohmic contact island 165 form a pair so as to be disposed on the projection 154 of the semiconductor 151.

A plurality of data lines 171 and a plurality of drain electrodes 175 are disposed on the ohmic contact stripes 161 and ohmic contact islands 165.

The data line 171 is configured to transmit a data signal and mainly extends in a vertical direction to cross the gate line 121.

Each data line 171 includes a plurality of source electrodes 173 extending toward the gate electrode 124, and an end having a wide area (not illustrated) that connects with another layer or an external driving circuit.

The drain electrode 175 is separated from the data line 171 and faces the source electrode 173 based on the gate electrode 124.

The drain electrode 175 includes one end having a rod shape and an extending portion having a wide area. The end having a rod shape is partially surrounded by the bent source electrode 173.

The gate electrode 124, the source electrode 173, and the drain electrode 175 form one thin film transistor (TFT) along with the projection 154 of the semiconductor 151, and a channel of the thin film transistor is disposed in the semiconductor 151 between the source electrode 173 and the drain electrode 175.

The data line 171 and the drain electrode 175 may be made of a refractory metal such as molybdenum, chromium, tantalum, or titanium, or an alloy thereof, and have a multilayer structure including a refractory metal layer (not illustrated) and a low resistance conductive layer (not illustrated). An example of the multilayer structure includes a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 may be made of various metals or conductors in addition to the metals and layers mentioned above.

The ohmic contact stripes 161 and ohmic contact islands 165 exist only between the semiconductor 151 therebelow and the data line 171 and the drain electrode 175 thereon, and reduce a contact resistance therebetween.

A passivation layer 180 is disposed on the data line 171, the drain electrode 175, and an exposed part of the semiconductor 151.

The passivation layer 180 is made of an inorganic insulator, an organic insulator, or the like, and may have a flat surface. An example of the inorganic insulator includes silicon nitride and silicon oxide. The organic insulator may have photosensitivity, and a dielectric constant thereof may be about 4.0 or less. However, the passivation layer 180 may have a double layer structure including a lower inorganic layer and an upper organic layer so as not to do damage to the exposed part of the semiconductor 154 while promoting an excellent insulation property of the organic layer.

A first contact hole 185 exposing the drain electrode 175 is disposed on the passivation layer 180, and a plurality of second and third contact holes 186a and 186b, which exposes a part of the reference electrode 270 disposed in two adjacent pixel areas in a pixel row direction, respectively, is disposed on the passivation layer 180 and the gate insulating layer 140.

On the passivation layer 180, a plurality of pixel electrodes 190 and a plurality of first contact assistants 196 are disposed. The plurality of pixel electrodes 190 and the plurality of first contact assistants 196 may be made of a transparent conductive material such as polycrystal, monocrystal, or amorphous indium tin oxide (ITO), indium zinc oxide (IZO) or the like, or a reflective metal such as aluminum, silver, chromium, or an alloy thereof.

The first contact assistant 196 connects the reference electrodes 270 of adjacent pixels, which are exposed through the second contact hole 186a and the third contact hole 186b.

The pixel electrode 190 includes a plurality of branch electrodes 191. The branch electrodes 191 of the pixel electrode 190 extend in a direction substantially parallel to the gate line 121, and may be inclined to form an angle of about 5 to 20 degrees with respect to the gate line 121.

The pixel electrode 190 is physically and electrically connected with the drain electrode 175 through the first contact hole 185, and is configured to receive data voltage from the drain electrode 175. The pixel electrode 190, to which data voltage is applied, is configured to generate an electric field along with the reference electrode 270, which is configured to receive a reference voltage, so that the liquid crystal molecule of the liquid crystal layer (not illustrated) disposed on the two electrodes 190 and 270 rotates in a direction parallel to a direction of the electric field. Polarization of light passing through the liquid crystal layer varies depending on a rotational direction of the liquid crystal molecule as determined above.

Figure 8:
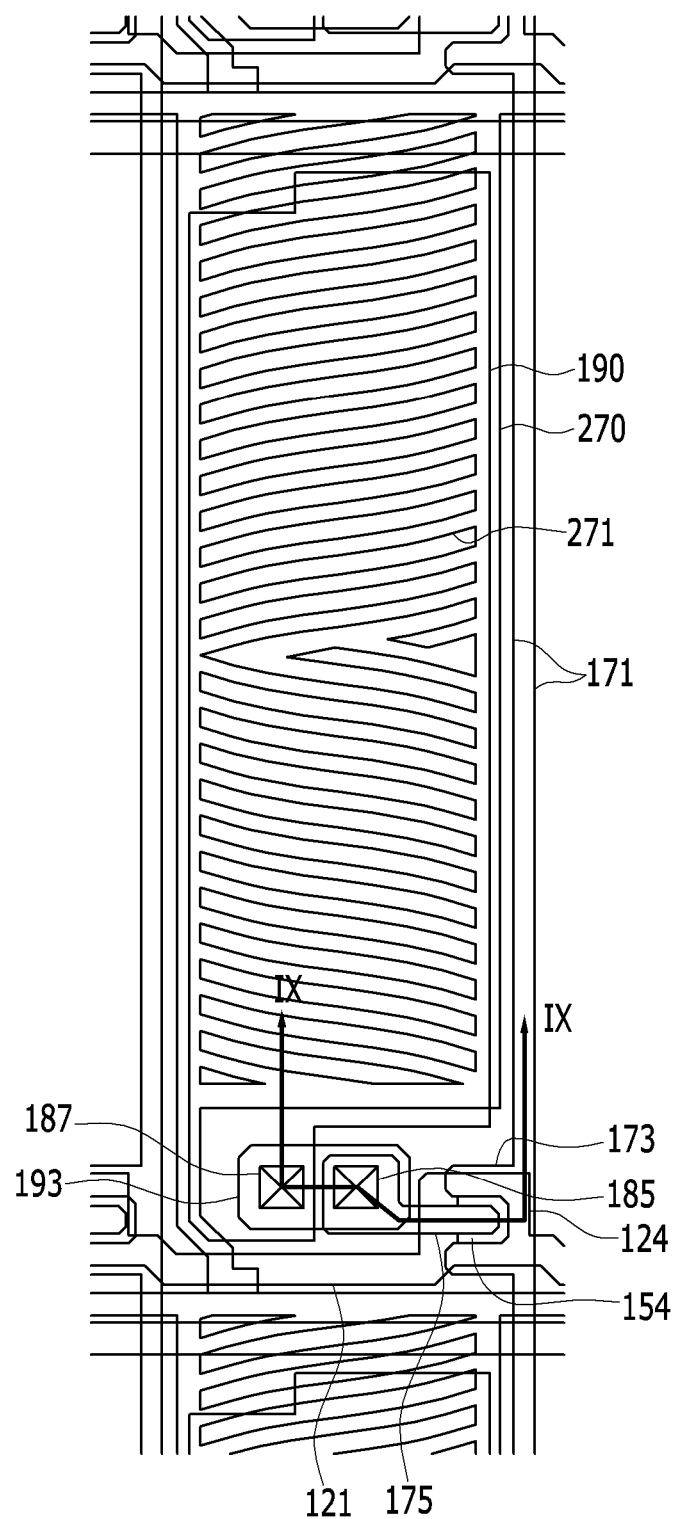
FIG. 8 is a layout view illustrating a pixel of the thin film transistor array panel according to exemplary embodiments.

FIG. 8 is a layout view illustrating a pixel of the thin film transistor array panel according to exemplary embodiments, and FIG. 9 is a cross-sectional view illustrating the thin film transistor array panel of FIG. 8 taken along sectional line IX-IX.

Referring to FIGS. 8 and 9, a layer structure of the thin film transistor array panel is similar to a layer structure of the thin film transistor array panel described in association with FIGS. 6 and 7.

As illustrated in FIGS. 8 and 9, the thin film transistor array panel, the gate line 121, and the pixel electrode 190 are disposed on the insulation substrate 110. The pixel electrode 190 includes a plurality of branch electrodes 191. The pixel electrode 190 has a plane shape covering all the pixel area.

On the gate line 121 and the pixel electrode 190, the gate insulating layer 140, which may be made of silicon nitride (SiNx), silicon oxide (SiOx), or the like, is disposed.

On the gate insulating layer 140, a plurality of semiconductor stripes 151 made of hydrogenated amorphous silicon (amorphous silicon is also referred to as a-Si as an abbreviation), polysilicon, or the like is disposed. The semiconductor stripes 151 mainly extend in a vertical direction and include a plurality of projections 154 extending toward the gate electrode 124.

On the semiconductor 151, a plurality of ohmic contact stripes 161 and ohmic contact islands 165 are disposed. The ohmic contact stripes 161 and ohmic contact islands 165 may be made of a material such as n+ hydrogenated amorphous silicon in which an n-type impurity, such as phosphorus, is doped at a high concentration, or silicide. The ohmic contact stripe 161 has a plurality of projections 163, and the projection 163 and the ohmic contact island 165 form a pair so as to be disposed on the projection 154 of the semiconductor 151.

A plurality of data lines 171 and a plurality of drain electrodes 175 are disposed on the ohmic contact stripes 161 and ohmic contact islands 165.

The data line 171 is configured to transmit a data signal and mainly extends in a vertical direction to cross the gate line 121.

Each data line 171 includes a plurality of source electrodes 173 extending toward the gate electrode 124, and an end having a wide area (not illustrated) for connection with another layer or an external driving circuit.

The drain electrode 175 is separated from the data line 171 and faces the source electrode 173 based on the gate electrode 124.

The drain electrode 175 includes one end having a rod shape and an extending portion having a wide area. The end having a rod shape is partially surrounded by the bent source electrode 173.

The passivation layer 180 is disposed on the data line 171, the drain electrode 175 and the exposed part of the semiconductor 151.

The first contact hole 185 exposing the drain electrode 175 is disposed on the passivation layer 180, and a fourth contact hole 187 exposing a part of the pixel electrode 190 is disposed on the gate insulating layer 140 and the passivation layer 180.

On the passivation layer 180, the reference electrode 270 and the second contact assistant 193 are disposed. The reference electrode 270 includes a plurality of branch electrodes 271. The branch electrodes 271 extend in a direction substantially parallel to the gate line 121, and may be inclined to form an angle of about 5 to 20 degrees with respect to the gate line 121.

The second contact assistant 193 connects the drain electrode 175 exposed through the first contact hole and the pixel electrode 190 exposed through the fourth contact hole 187.

Accordingly, in the thin film transistor array panel of FIGS. 8 and 9, unlike the thin film transistor array panel illustrated in FIGS. 6 and 7, the pixel electrode 190 is disposed in the same layer as the gate line 121 and the reference electrode 270 having a plurality of branch electrodes 270 is disposed on the passivation layer 180. The remaining structure of the thin film transistor array panel is substantially the same as the thin film transistor array panel illustrated in FIGS. 6 and 7.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display, comprising:
    a liquid crystal panel comprising a first display panel and opposing second display panel opposite the first display panel;
    a backlight assembly configured to provide light to the liquid crystal panel;
    a receiving member configured to support the backlight assembly; and
    an adhesive member configured to couple the liquid crystal panel and the receiving member,
    wherein the first display panel comprises a display area configured to display an image, a peripheral area disposed outside the display area, and a plurality of integrated circuit ("IC") chips disposed in the peripheral area, and the plurality of IC chips being configured to apply a driving signal to the display area,
    wherein the adhesive member is disposed in the peripheral area and does not overlap with the plurality of IC chips,
    wherein the adhesive member comprises a body and a plurality of branches extending from the body, and
    wherein a width between the adjacent branches is greater than a width of an IC chip.

2. The liquid crystal display of claim 1, wherein the adhesive member is disposed on a surface opposite a surface on which the IC chip is disposed.

3. The liquid crystal display of claim 1, wherein the plurality of branches comprises a plurality of first branches and a plurality of second branches.

4. The liquid crystal display of claim 3, wherein the body is disposed along one side of the first display panel.

5. The liquid crystal display of claim 4, wherein the plurality of first branches extends from both ends of the body.

6. The liquid crystal display of claim 5, wherein the plurality of second branches is disposed between each of the plurality of first branches.

7. The liquid crystal display of claim 6, wherein the plurality of second branches is disposed alternating with the plurality of IC chips.

8. The liquid crystal display of claim 7, wherein the adhesive member further comprises at least one connecting part configured to connect one of the plurality of first branches and one of the plurality of second branches.

9. The liquid crystal display of claim 8, wherein the at least one connecting part is disposed along one side of the first display panel opposite the one side comprising the body.

10. The liquid crystal display of claim 1, wherein the first display panel further comprises:
    a gate line and a reference electrode disposed on a substrate,
    a gate insulating layer disposed on the gate line and the reference electrode,
    a semiconductor disposed on the gate insulating layer,
    a data line disposed on the semiconductor and comprising a source electrode,
    a drain electrode disposed on the semiconductor and facing the source electrode,
    a passivation layer disposed on the data line and the drain electrode, and
    a pixel electrode disposed on the passivation layer and connected with the drain electrode.

11. The liquid crystal display of claim 10, wherein the pixel electrode comprises a plurality of branch electrodes.

12. The liquid crystal display of claim 11, wherein the first display panel further comprises a first contact assistant disposed on the passivation layer and connected with the reference electrode.

13. The liquid crystal display of claim 1, wherein the first display panel further comprises:
    a gate line and a pixel electrode disposed on a substrate,
    a gate insulating layer disposed on the gate line and the pixel electrode,
    a semiconductor disposed on the gate insulating layer,
    a data line disposed on the semiconductor and comprising a source electrode,
    a drain electrode disposed on the semiconductor and facing the source electrode,
    a passivation layer disposed on the data line and the drain electrode, and
    a reference electrode disposed on the passivation layer.

14. The liquid crystal display of claim 13, wherein the reference electrode comprises a plurality of branch electrodes.

15. The liquid crystal display of claim 14, wherein the first display panel is disposed on the passivation layer and further comprises a second contact assistant connecting the pixel electrode and the drain electrode.

16. A display, comprising:
    a display panel;
    a backlight assembly configured to illuminate the display panel;
    a receiving member configured to support the backlight assembly; and
    an adhesive member configured to couple the display panel and the receiving member, wherein the display panel comprises a display area configured to display an image, a peripheral area disposed outside the display area, and a plurality of integrated circuit ("IC") chips disposed in the peripheral area, the plurality of IC chips being configured to apply a driving signal to the display area, and wherein the adhesive member is disposed in the peripheral area and does not overlap with the plurality of IC chips, wherein the adhesive member comprises a body and a plurality of branches extending from the body, and wherein a width between the adjacent branches is greater than a width of an IC chip.

17. The display of claim 16, wherein the plurality of branches comprises a plurality of first branches and a plurality of second branches.

18. The display of claim 17, wherein the adhesive member further comprises a connecting part connecting the plurality of first branches and the plurality of second branches.

19. The display of claim 16, wherein the IC chip is disposed between planes of the adjacent branches.

* * * * *